(12) United States Patent
Currano et al.

(10) Patent No.: US 8,829,373 B2
(45) Date of Patent: Sep. 9, 2014

(54) THREE-AXIS ACCELERATION SWITCH ARRAY

(71) Applicants: Luke J. Currano, Columbia, MD (US); Larry D. Thomas, Jr., Leander, TX (US); Collin R. Becker, Beltsville, MD (US); Gabriel L. Smith, Odenton, MD (US); Brian Isaacson, Baltimore, MD (US)

(72) Inventors: Luke J. Currano, Columbia, MD (US); Larry D. Thomas, Jr., Leander, TX (US); Collin R. Becker, Beltsville, MD (US); Gabriel L. Smith, Odenton, MD (US); Brian Isaacson, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 84 days.

(21) Appl. No.: 13/622,588

(22) Filed: Sep. 19, 2012

(65) Prior Publication Data

US 2014/0076696 A1    Mar. 20, 2014

(51) Int. Cl.
*H01H 35/02*  (2006.01)
*H01H 35/14*  (2006.01)

(52) U.S. Cl.
CPC ............. *H01H 35/141* (2013.01); *H01H 35/14* (2013.01)

USPC .................................. 200/61.45 R; 200/61.46

(58) Field of Classification Search
USPC ................................................... 200/61.45 R
See application file for complete search history.

(56) References Cited

U.S. PATENT DOCUMENTS

| | | | | |
|---|---|---|---|---|
| 3,448,621 A * | 6/1969 | Magda et al. | ............... | 73/514.35 |
| 5,365,768 A * | 11/1994 | Suzuki et al. | .................. | 73/1.01 |
| 5,524,789 A * | 6/1996 | Jackman | ........................ | 220/666 |
| 6,765,160 B1 * | 7/2004 | Robinson | ............... | 200/61.45 R |
| 7,371,982 B2 * | 5/2008 | Greywall | ............... | 200/61.45 R |
| 8,237,521 B1 * | 8/2012 | Smith | ............................. | 335/78 |

* cited by examiner

*Primary Examiner* — Kyung Lee
(74) *Attorney, Agent, or Firm* — Alan I. Kalb

(57) ABSTRACT

An acceleration switch array having at least two acceleration switches. Each acceleration switch includes a substrate, an anchor attached to the substrate, an electrically conductive mass disposed around the anchor and secured to the anchor by a spring assembly which permits movement of the mass relative to the anchor, and a plurality of electrical contacts positioned at circumferentially spaced positions around and outwardly from the mass. These electrical contacts are aligned along at least one orthogonal axis. A resistor array is electrically connected between the electric contacts of each acceleration switch for each orthogonal axis so that, upon contact between the mass and any of the electrical contacts, an electrical resistance is presented at an output terminal that is unique for each electrical contact for each acceleration switch.

9 Claims, 3 Drawing Sheets

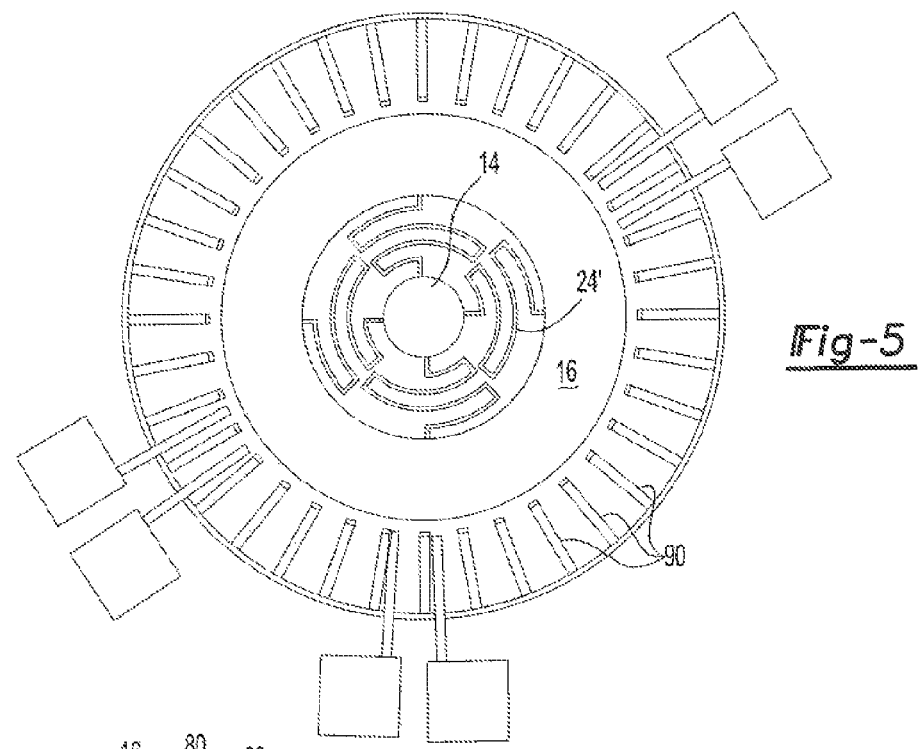
Fig-5
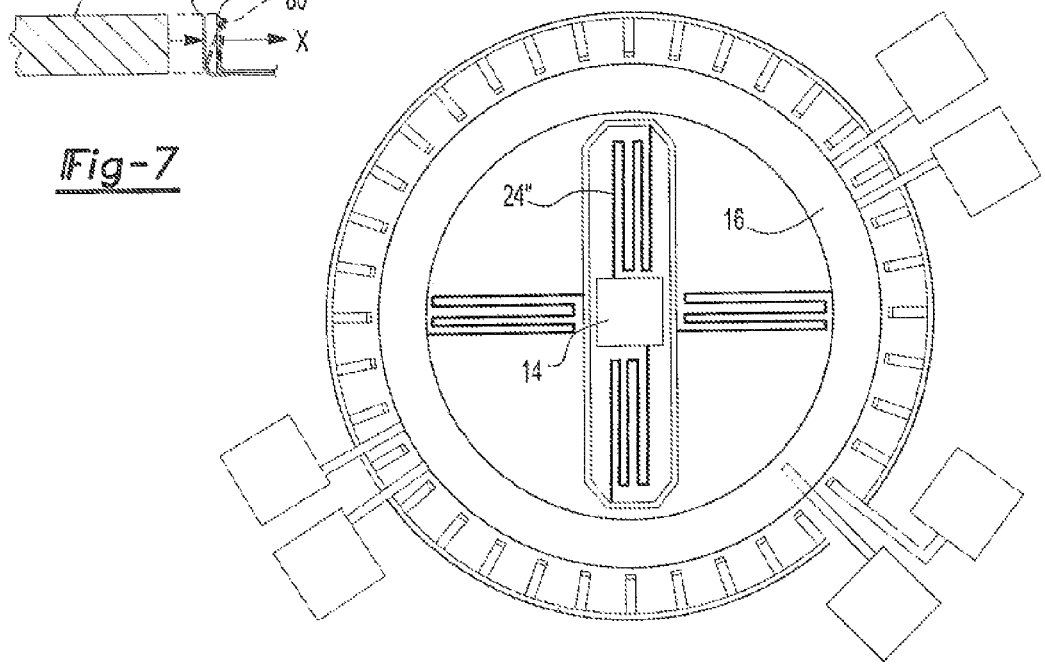
Fig-7
Fig-6

THREE-AXIS ACCELERATION SWITCH ARRAY

GOVERNMENT INTEREST

The invention described herein may be manufactured, used, and licensed by or for the United States Government.

BACKGROUND OF THE INVENTION

1. Field of the Invention

The present invention relates to a three-axis acceleration switch array.

2. Description of Related Art

There is a need for acceleration sensor that can be used for traumatic brain injury (TBI) monitoring for extended periods of time and in a very small and lightweight package. Preferably the package would be small enough to be inserted into an earplug or affixed to the skin with adhesive tape. Such a switch could also have relevant applications in package surveillance, shipping damage sensing, inertial wake-up switch for persistent low-power sensing systems, security system wakeup/trigger for vehicles, airbag deployment sensors, impact or contact detection in robotics, munition target impact detection, and many more.

The relevant acceleration threshold ranges, specific to TBI, are approximately 30 g-300 g with a time resolution of 100 microseconds or faster.

There have been previously known acceleration sensors which have been fitted to helmets, including helmets for both civilian and army applications. The monitoring for TBI using a helmet mounted acceleration sensor, however, is less than ideal since such helmets designed to absorb energy and lower the acceleration of the head. Consequently, accurate monitoring of the head acceleration for TBI monitoring cannot be achieved with helmet mounted acceleration sensors.

There have been many previously known small accelerometers. However, these previously known accelerometers have been active and thus require electrical power on full-time basis. Even with a low current draw, such accelerometers are simply inadequate for long term military use in very small systems with minimal space for batteries or other power supplies. This low power is an advantage for reducing the size of systems outside the scope of TBI as well for reduction size in overhead subcomponents as well.

A still further disadvantage of these previously known accelerometers is that such accelerometers have not proven either efficient or accurate in the measurement of the direction of the impact. However, for TBI monitoring purposes, the direction of the impact can be critical.

SUMMARY OF THE PRESENT INVENTION

The present invention provides an acceleration switch array which overcomes the above-mentioned disadvantages of the previously known accelerometer sensors, providing a sensor that uses no power until an acceleration event occurs.

In brief, the acceleration switch array of the present invention comprises at least two acceleration switches, each having a substrate which may be made of any suitable material, such as silicon. An anchor made of a conductive material is attached to the substrate and immovable relative to the substrate for each acceleration switch.

An annular electrically conductive mass is then disposed around the anchor for each acceleration switch and secured to the anchor by a spring assembly. This spring assembly permits movement of the mass relative to its associated anchor, preferably in any direction, including all three orthogonal directions.

A plurality of electrical contacts are positioned at circumferentially spaced positions around and spaced outwardly from the mass for each acceleration switch. Thus, in the event of an impact in the X or Y direction, the mass will move relative to the anchor and make contact with a contact aligned with the direction of movement of the impact. Similarly, contacts are positioned both above and below the mass to detect movement of the mass in the Z direction.

The acceleration switches differ from each other in the acceleration threshold required to make contact between the conductive mass and its associated contacts. For example, the threshold for one switch may be 30 g and the other switch may be 200 g.

All of the contacts from both acceleration switches and for each axis are connected to a resistor array which, in turn, is connected to an output terminal. Upon contact between the mass and one of the contacts, an electrical circuit is completed through the mass, spring assembly, and anchor as well as one or more resistors in the resistor array. Consequently, the resistance present at the output terminal is unique for each electrical contact in each axis for each acceleration switch. Thus an electrical circuit, by processing the resistance at the electric terminal, may determine not only the direction of the impact, but also the magnitude of the impact.

Alternatively, it is possible to achieve a two or even more threshold acceleration switch array by providing a second set of electrodes at a position more spaced from the mass. This second set of electrodes would only be contacted by the mass when the acceleration exceeded a second threshold, greater than the first, so that the acceleration switch array provides an indication of the acceleration for two different thresholds and the direction of that acceleration.

A primary advantage of the present invention over the previously known accelerometers is that the acceleration switch array of the present invention only draws electrical current during an impact event. Conversely, when the mass is not in contact with any of the switches, no electrical current is drawn by the switch array.

BRIEF DESCRIPTION OF THE DRAWING

A better understanding of the present invention will be had upon reference to the following detailed description when read in conjunction with the accompany drawing, wherein like reference characters refer to like parts throughout the several views, and in which:

FIG. 5 is a plan view of a single acceleration switch similar to FIG. 2, but illustrating a modification thereto;

FIG. 6 is a plan view of a single acceleration switch similar to FIG. 2, but illustrating a modification thereto; and FIG. 7 is a plan view of a single acceleration switch similar to FIG. 2, but illustrating a modification thereto.

DETAILED DESCRIPTION OF PREFERRED EMBODIMENTS OF THE PRESENT INVENTION

Figure 1:
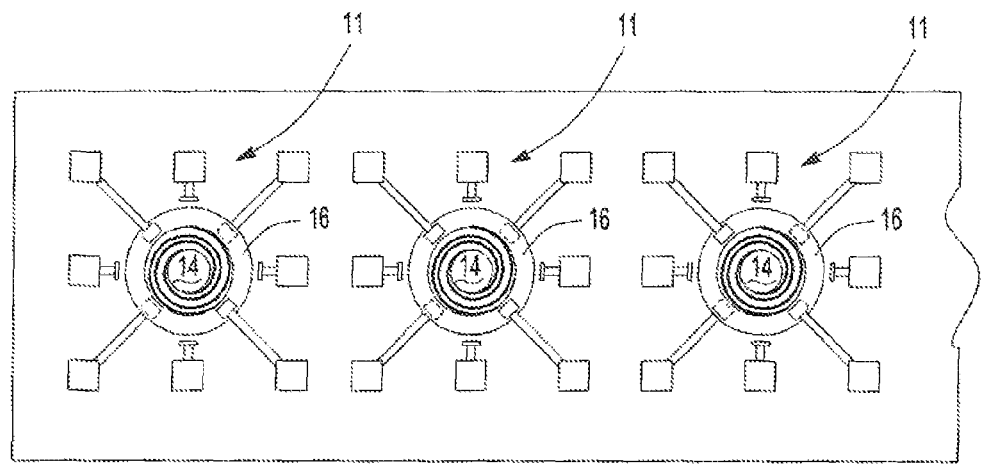
FIG. 1 is an elevational view of a preferred embodiment of the invention.

With reference first to FIG. 1, a preferred embodiment of an acceleration switch array 10 in accordance with the present invention is shown. The switch array 10 includes at least two, and preferably more, aligned acceleration switches 11. The acceleration switches 11 are substantially identical in construction, except for the threshold impact necessary to activate the switch, so that only one switch will be described in detail, it being understood that a like description applies to the other switches 11.

Figure 2:
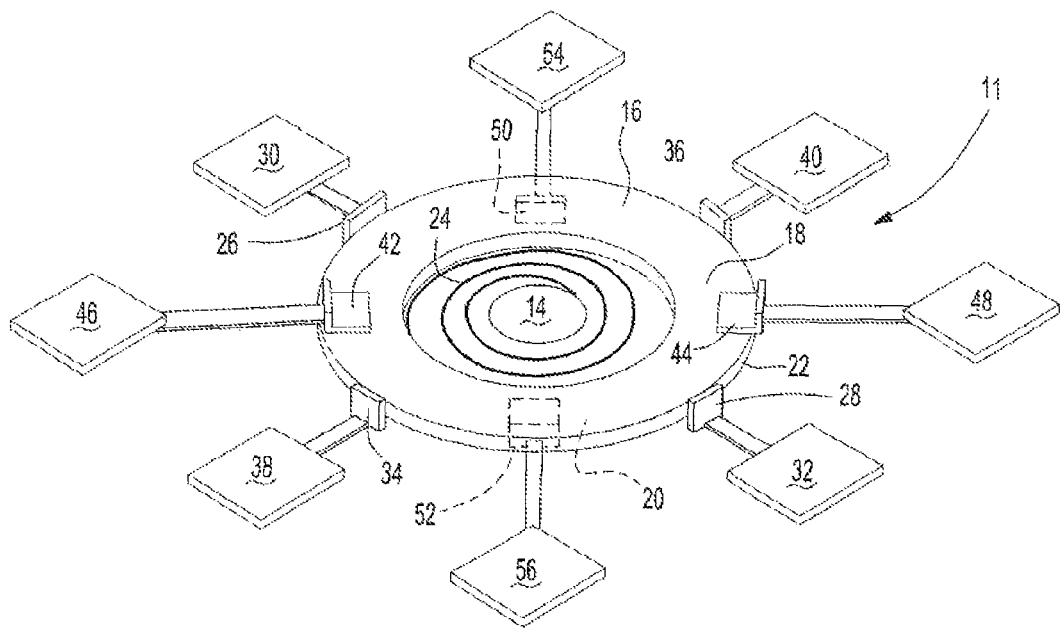
FIG. 2 is a plan view of a single acceleration switch.

With reference to FIG. 2, the accelerator switch 11 includes a substrate 12 which may be made of any conventional material, such as silicon. An anchor 14 is attached to the substrate 12 which does not move relative to the substrate 12. The anchor 14 is constructed of an electrically conductive material.

An annular mass 16 having a top 18, bottom 20, and an outer circumfery 22 is disposed around the anchor 14. A spring assembly 24, also constructed of an electrically conductive material, extends between and is secured to both the anchor 14 and the annular mass 18. The spring assembly 24 is designed to maintain the annular mass 18 while the substrate 12 is stationary. However, in the event of an acceleration of the substrate 12, typically caused by an impact, the mass 18 will move relative to the anchor 14 in a direction opposite from the direction of the acceleration and to an extent proportional to the magnitude of that acceleration.

A pair of diametrically opposed electrical contacts 26 and 28, each connected to an electrical pad 30 and 32, respectively, are mounted to the substrate 12 so that the electrical contacts 26 and 28 are spaced radially outwardly from the annular mass 18 when it is at rest. These contacts 26 and 28, furthermore, are aligned along at least one orthogonal axis, such as the X axis.

Similarly, a pair of diametrically opposed electrical contacts 34 and 36 each having an electrical pad 38 and 40, respectively, are mounted on the substrate 12 so that the contacts 34 and 36 are aligned with a second orthogonal axis, i.e. the Y axis. Each electrical contact 34 and 36 is spaced radially outwardly from the mass 18 when the mass is at rest.

A pair of contacts 42 and 44, each having an electrical pad 46 and 48, respectively, are also mounted to the substrate 12 so that the contacts 42 and 44 are spaced upwardly from the upper surface 18 of the mass 16. Similarly, a further pair of contacts 50 and 52, each having its own electrical pad 54 and 56, are mounted to the substrate 12 so that the contacts 50 and 52 are spaced below the bottom surface 20 of the mass 16. The contacts 42, 44, 50 and 52 are thus aligned along the Z axis for the mass 16.

Figure 3:
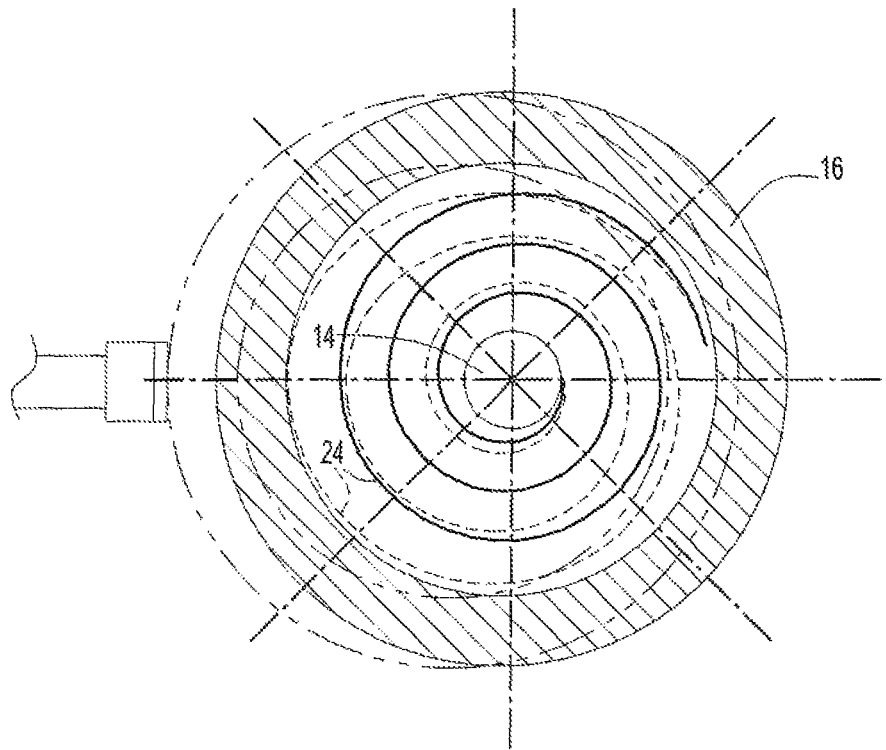
FIG. 3 is a plan view illustrating the operation of a single acceleration switch.

With reference now to FIG. 3, in the event that the substrate 12 with its attached anchor 14 undergoes an acceleration from an impact, the mass 16 will move in the opposite direction of the acceleration and in an amount that is proportional to the magnitude of the acceleration. Consequently, the direction of the impact can be determined by a circuit which detects which of the several contacts has been contacted by the mass.

The mass 16 contacts one of the electrical contacts, as shown in phantom line, whenever the acceleration of the substrate 12 exceeds a predetermined threshold. That threshold is determined by a number of factors, including the design of the spring assembly 24 and the spacing between the various electrical contacts and the mass 16 and weight of the mass 16. Consequently, in order to obtain an acceleration switch array that provides an output signal that varies as a function of the magnitude of the acceleration, multiple acceleration switches 11 are coupled together with each acceleration switch 11 having a different threshold.

One problem with assembling a plurality of different acceleration switches 11 into an array, each switch 11 having a different threshold value, is that the number of outputs from the array becomes unmanageable for small microprocessors which have a limited number of input signal lines. For example, assuming that each acceleration switch array potentially provides six output signals, i.e. ±X axis, ±Y axis, and ±Z axis, an acceleration switch array 10 having five acceleration switches 11, each with a different threshold, would have no less than thirty output signals. This is unacceptable for many small microprocessors with limited input lines. Reducing the number of outputs will also reduce the overall size of the device as the output pins must be a minimum size to form electromechanical interconnects.

Figure 4:
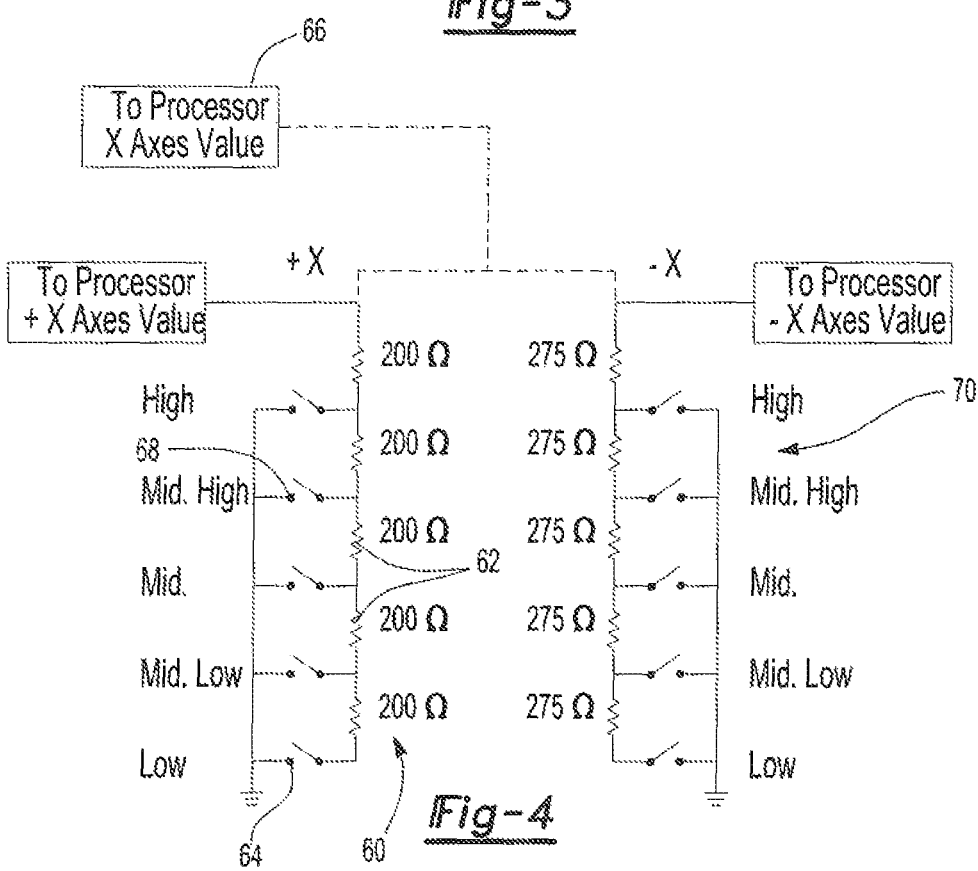
FIG. 4 is a schematic view of a portion of the present invention.

With reference now to FIG. 4, in order to accommodate multiple acceleration switch arrays, e.g. five acceleration switch arrays each having a different threshold, each axis of movement, e.g. the +X axis of movement, may be electrically coupled through a resistor array 60 so that, for example, upon contact of any of the masses 60 along the +X axis, the +X axis contact in one or more of the acceleration switches 11 would complete an electrical circuit to ground through one or more resistors 62 in the resistor array 60. For example, if only a relatively low acceleration was imparted to the switch array 10 containing multiple acceleration switches 11, only the acceleration switch 64 would close thus electrically connecting all five resistors 62 in the resistor array 60 in series with an output terminal 66. A microprocessor utilizing a single input line sensing the resistance at terminal 66 would identify that only the lowest threshold acceleration switches 11 had reached its threshold level.

Conversely, in the event of a high impact so that the highest threshold acceleration switch array 68 closed, even though all of the lower threshold switches would close, only a single resistor 62 of the resistor array 60 will be connected in series between the terminal 66 and ground. This resistance would then be identified by the processor. Consequently, for a switch array 10 having multiple acceleration switches 11, each switch 11 presents a unique resistance at the output terminal 66 along axis of impact. Since each acceleration switch 11 closes at a different acceleration threshold, the approximate magnitude of the impact can be determined.

Still referring to FIG. 4, a second resistor array 70 is shown for the −X axis direction. Optionally, the resistors 72 in the resistor array present unique values to the output terminal 66 by the selection of different values for the resistors 72 so that both the magnitude and direction along each axis can be determined by a single input terminal 66 to a processor. Still different resistor arrays are similarly provided for the Y and Z axes.

Consequently, in this fashion, multiple acceleration switches 11 may be ganged together to produce an output signal not only of the direction of the array, but also the magnitude, or approximate magnitude, of the acceleration.

Although the spring assembly 24 illustrated in FIG. 1 is shown as having a plurality of spiral spring elements, other forms for the spring assembly may alternatively be used. For example, as best shown in FIG. 5, a modified spring assembly 24' is shown which comprises alternating circumferential and radial spring elements.

Similarly, with reference to FIG. 6, a still modified spring assembly 24" is shown in which the spring assembly 24 is formed from a plurality of radially extending spring elements between the anchor 14 and a rigid frame. These springs are flexible in the horizontal direction but stiff in the vertical direction. Another set of springs, flexible in the vertical direction but stiff in the horizontal direction, connects the rigid frame to the mass 16. This enables independent design of the horizontal and vertical axis stiffnesses, for instance if the desired acceleration threshold is much higher in the horizontal axis than the vertical axis or vice versa. Still other designs for the spring assembly 24 may be employed without deviation from the spirit or scope of the invention.

With reference now to FIG. 7, in a modification of the acceleration switch array, a pair of radially spaced contacts 80 and 82 are shown for use with the +X axis. The inner contact 80 may be suspended from a spring to allow it to displace outward. Multiple thresholds may be obtained in this design since, during an acceleration of a relatively low threshold, the mass 16 contacts the first contact 80 as shown in phantom line 84. The acceleration switch array then determines by any conventional way that the mass 16 has only contacted the first or radially inner contact 80 but not the outer contact 82. In doing so, the acceleration is above the threshold defined by the radially inner contact 80 but less than the threshold defined by the radially outer contact 82.

Conversely, in the event of a higher acceleration as shown in phantom line 86 in FIG. 7 in which the mass 16 pivots the inner radial contact outwardly and contacts the outer radial contact 82, the acceleration switch array has undergone an acceleration greater than a threshold defined by the outer contact 82.

It will be understood, of course, that the provision of multiple contacts is also applicable for the ±Y axis as well as the −X axis as well as the ±Z axis. Furthermore, although only two contacts 80 and 82 are illustrated in FIG. 7, three or even more contacts, each representing a different acceleration threshold, may be utilized without deviation from the spirit or scope of the invention.

In the acceleration switch array illustrated in FIG. 2, only a single electrical contact was provided along both the ±X axis, ±Y axis, and ±Z axis. However, in some cases, more accurate measurement of the angle of the impact is desired.

Consequently, and with reference now to FIG. 5, the switch array 10 is shown in which a plurality of electrical contacts 90 are disposed around the outer periphery of the mass 16 at a relatively close angular spacing. Consequently, in the event of acceleration, the mass 16 may contact one or more of the contacts 90. The precise contacts 90 that were contacted by the mass 16 may be identified thus providing a more accurate indication of the direction of the acceleration.

An conventional method may be utilized to manufacture the acceleration switch array of the present invention. However, preferably the switch array is constructed using conventional MEMS technology.

From the foregoing, it can be seen that the present invention provides a simple yet effective acceleration switch array that provides not only accurate three-axis detection of the direction of the acceleration but also improved indication of the magnitude of the acceleration. Having described our invention, however, many modifications thereto will become apparent to those skilled in the art to which it pertains without deviation from the spirit of the invention as defined by the scope of the appended claims.

The invention claimed is:

1. An acceleration switch array comprising:
   at least two acceleration switches, each switch having
      a substrate,
      an anchor attached to said substrate,
      an electrically conductive mass disposed around said anchor and secured to said anchor by a spring assembly which permits movement of said mass relative to said anchor, and
      a plurality of electrical contacts positioned at circumferentially spaced positions around and spaced outwardly from said mass, said electrical contacts aligned along at least one orthogonal axis,
   a resistor array electrically connected between said electrical contacts of each acceleration switch and for each orthogonal axis and an output terminal, each electrical contact for each acceleration switch electrically connected to an associated different resistor or group of resistors in said resistor an ay so that, upon contact between said mass and any of said contacts, an electrical resistance is presented at said output terminal which is unique for each electrical contact and for each acceleration switch.

2. The acceleration switch array as defined in claim 1 wherein at least two of the contacts are diametrically opposed from each other along an X axis.

3. The acceleration switch array as defined in claim 2 wherein at least two of the contacts are diametrically opposed from each other along a Y axis offset from said X axis by 90 degrees.

4. The acceleration switch array as defined in claim 3 wherein at least two of the contacts are positioned adjacent, but spaced from, opposite ends of said mass along a Z axis perpendicular to both said X and said Y axis.

5. The acceleration switch array as defined in claim 1 wherein said mass is electrically connected to a first voltage potential and wherein each contact is electrically connected through its associated resistor or group of resistors to said output terminal at a second voltage potential different from said first voltage potential.

6. The acceleration switch array as defined in claim 1 wherein said spring assembly comprises a plurality of spiral springs positioned between said anchor and said mass.

7. The acceleration switch array as defined in claim 1 wherein said spring comprises a plurality of spring segments which extend in a substantially radial direction between said mass and said anchor.

8. The acceleration switch array as defined in claim 1 wherein said spring comprises a plurality of spring segments which extend in alternating circumferential and radial directions between said mass and said anchor.

9. The acceleration switch array as defined in claim 1 wherein the mass is annular in shape.

\* \* \* \* \*